US012458819B2

(12) United States Patent
Bühlmann et al.

(10) Patent No.: US 12,458,819 B2
(45) Date of Patent: Nov. 4, 2025

(54) ARRANGEMENT FOR BREATHING APPARATUS, AND BREATHING APPARATUS

(71) Applicant: INTERSPIRO AB, Täby (SE)

(72) Inventors: Pierre Bühlmann, Lidingö (SE); Anders Johnsson, Spånga (SE); Lars Liljeberg, Tällberg (SE)

(73) Assignee: INTERSPIRO AB, Täby (SE)

( * ) Notice: Subject to any disclaimer, the term of this patent is extended or adjusted under 35 U.S.C. 154(b) by 948 days.

(21) Appl. No.: 17/629,834

(22) PCT Filed: Jul. 9, 2020

(86) PCT No.: PCT/EP2020/069419
§ 371 (c)(1),
(2) Date: Jan. 25, 2022

(87) PCT Pub. No.: WO2021/023466
PCT Pub. Date: Feb. 11, 2021

(65) Prior Publication Data
US 2022/0273968 A1 Sep. 1, 2022

(30) Foreign Application Priority Data
Aug. 2, 2019 (SE) .................................... 1950911-6

(51) Int. Cl.
*A62B 9/02* (2006.01)
*B63C 11/22* (2006.01)

(52) U.S. Cl.
CPC ............ *A62B 9/02* (2013.01); *B63C 11/2236* (2013.01)

(58) Field of Classification Search
CPC .. A62B 9/02; A62B 9/022; A62B 7/04; A62B 7/14; A62B 17/008; A62B 18/10;
(Continued)

(56) References Cited

U.S. PATENT DOCUMENTS 3,456,642 A 7/1969 Cupp
5,924,418 A * 7/1999 Lewis ..................... B63C 11/24 128/204.22
(Continued)

FOREIGN PATENT DOCUMENTS

DE 3603130 A1 8/1987
GB 1105724 A 3/1968
(Continued)

OTHER PUBLICATIONS

Article: Drager, Self-Contained Respiratory Protection, Jul. 21, 2016, p. 9, Paragraph 1 under important instructions (Year: 2016).*
(Continued)

*Primary Examiner* — Brandy S Lee
*Assistant Examiner* — Sydney Reyes Russell
(74) *Attorney, Agent, or Firm* — RMCK Law Group, PLC

(57) ABSTRACT

An arrangement for a breathing apparatus, the arrangement comprising a breathing device; a primary connection point; a secondary connection point; a primary side; a secondary side; a first valve arranged between the primary connection point and the secondary connection point, the first valve being arranged to automatically close a first fluid connection between the primary connection point and the secondary connection point when a secondary pressure in the secondary side decreases below a first pressure threshold; and a second valve arranged on the secondary side, the second valve being arranged to automatically establish a second fluid connection between the secondary connection point and the breathing device when a primary pressure in the primary side decreases below a second pressure threshold. A breathing apparatus is also provided.

20 Claims, 1 Drawing Sheet

(58) Field of Classification Search
CPC .... F17C 13/045; B63C 11/22; B63C 11/2236; B63C 11/18; B64D 2231/00; B64D 2231/02
See application file for complete search history.

(56) References Cited

U.S. PATENT DOCUMENTS

| | | | | |
|---|---|---|---|---|
| 6,296,008 | B1 * | 10/2001 | Boyer | F17C 13/045 251/73 |
| 6,837,243 | B1 | 1/2005 | Fetters | |
| 2007/0039617 | A1 * | 2/2007 | Buhlmann | B63C 11/202 128/201.27 |
| 2016/0325122 | A1 * | 11/2016 | Contino | A62B 7/14 |

FOREIGN PATENT DOCUMENTS

| | | | | |
|---|---|---|---|---|
| KR | 101307495 | B1 * | 9/2013 | A62B 7/04 |
| WO | 8909903 | A1 | 10/1989 | |
| WO | 9114122 | A1 | 9/1991 | |
| WO | WO-9929357 | A1 * | 6/1999 | A62B 9/02 |
| WO | WO-2013108006 | A1 * | 7/2013 | F17C 13/04 |

OTHER PUBLICATIONS

Article: Agne, Estimating Your Air Consumption, Feb. 1, 2010, p. 3, Last Paragraph (Year: 2010).*
Article: Boey, Why Use Double Tanks, Dec. 16, 2016, p. 2, Paragraphs 10-12 (Year: 2016).*
PE2E Translation Choi KR_101307495_B1_H (Year: 2013).*
PCT International Search Report and Written Opinion dated Oct. 20, 2020 for International Application No. PCT/EP2020/069419, 12 pages.
Swedish Office Action and Search Report dated Mar. 25, 2020 for Swedish Patent Application No. SE1950911-6, 7 pages.

* cited by examiner

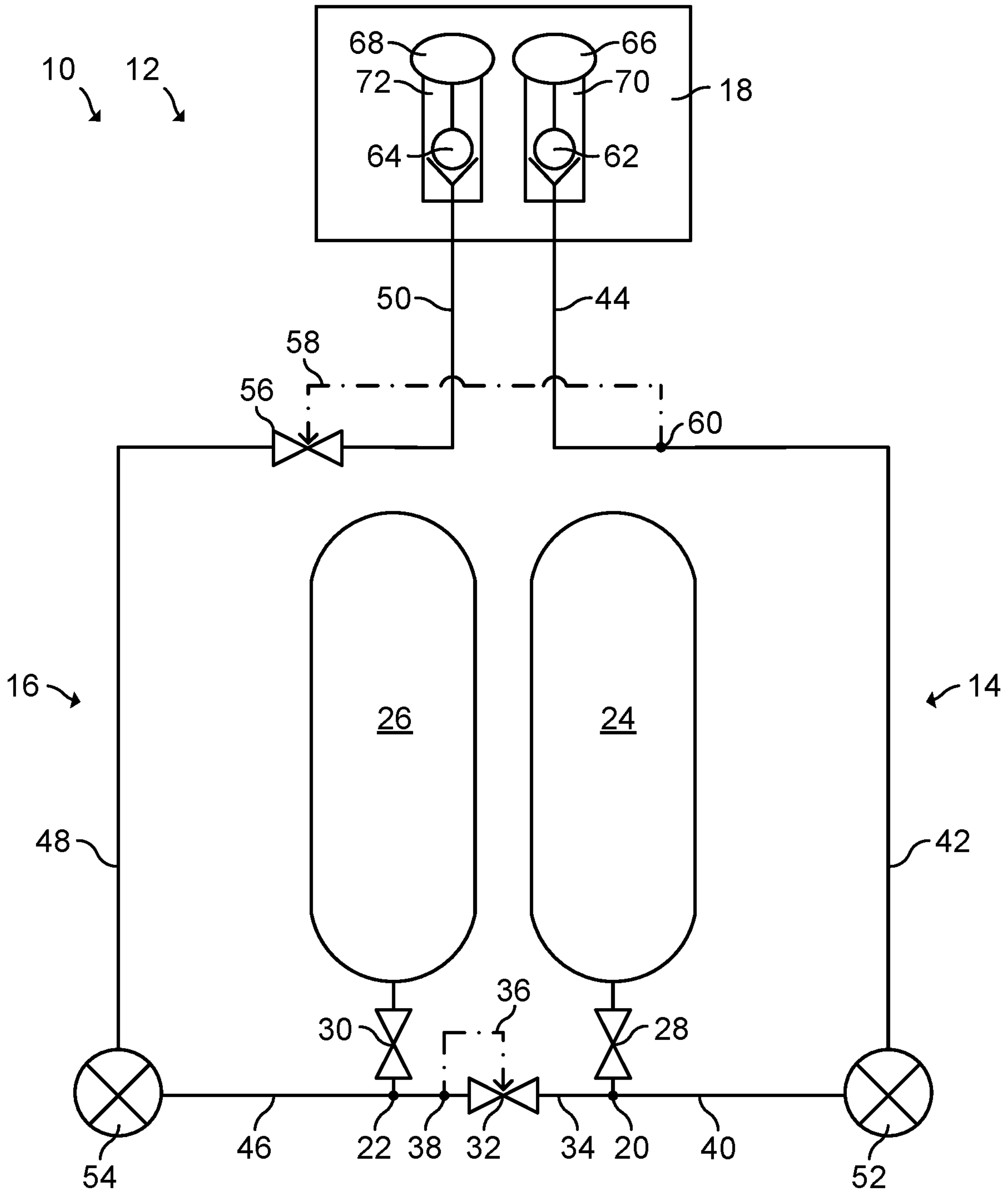
68
66
72
70
18
10
12
64
62
50
44
58
56
60
26
24
16
14
48
42
36
30
28
54
46
22
38
32
34
20
40
52

ARRANGEMENT FOR BREATHING APPARATUS, AND BREATHING APPARATUS

CROSS-REFERENCE TO RELATED APPLICATIONS

This application is a 371 U.S. National Stage of International Application No. PCT/EP2020/069419, filed Jul. 9, 2020, which claims priority to Swedish Patent Application No. 1950911-6, filed Aug. 2, 2019. The disclosures of each of the above applications are incorporated herein by reference in their entirety.

TECHNICAL FIELD

The present disclosure generally relates to an arrangement for a breathing apparatus. In particular, an arrangement for a breathing apparatus, and a breathing apparatus comprising such arrangement, are provided.

BACKGROUND

Pressurized breathing gas can be stored and delivered to users in a number of environments. For example, SCUBA divers, firefighters, high-altitude explorers, airplane pilots, and emergency workers may carry and breathe compressed breathing gas stored in tanks. The gas supply is typically metered to the person via a regulator.

With some breathing apparatuses, the user is required to manipulate one or more valves (such as cylinder valves and/or selection valves) when no gas is supplied to the user in order to initiate an emergency supply of gas, e.g. from an emergency tank. This may for example be needed when the gas from a primary supply has been consumed by the user or in the case of a failure, such as a hose rupture. Unfortunately, manipulation of such valves has not been successful in all situations. The user may for example be stressed and/or disoriented due to oxygen starvation and manipulate the valves erroneously.

WO 9114122 A1 discloses a valve for controlling the flow of fluid from two alternative supplies in such a manner that reduction or cessation of one supply automatically causes the valve to switch to the other supply. The valve may be used in underwater diving applications.

SUMMARY

One object of the present disclosure is to provide an arrangement for a breathing apparatus, which arrangement is safe.

A further object of the present disclosure is to provide an arrangement for a breathing apparatus, which arrangement enables a simple use.

A still further object of the present disclosure is to provide an arrangement for a breathing apparatus, which arrangement has a simple design.

A still further object of the present disclosure is to provide an arrangement for a breathing apparatus, which arrangement has a compact design.

A still further object of the present disclosure is to provide an arrangement for a breathing apparatus, which arrangement enables a symmetric design, such as the use of two equally sized containers for gas supply.

A still further object of the present disclosure is to provide an arrangement for a breathing apparatus, which arrangement is well balanced during use under water.

A still further object of the present disclosure is to provide an arrangement for a breathing apparatus, which arrangement solves several or all of the foregoing objects in combination.

A still further object of the present disclosure is to provide a breathing apparatus solving one, several or all of the foregoing objects.

According to one aspect, there is provided an arrangement for a breathing apparatus, the arrangement comprising a breathing device; a primary connection point for fluid communication with a primary container; a secondary connection point for fluid communication with a secondary container; a primary side arranged between the primary connection point and the breathing device; a secondary side arranged between the secondary connection point and the breathing device; a first valve arranged between the primary connection point and the secondary connection point, the first valve being arranged to automatically close a first fluid connection between the primary connection point and the secondary connection point when a secondary pressure in the secondary side decreases below a first pressure threshold; and a second valve arranged on the secondary side, the second valve being arranged to automatically establish a second fluid connection between the secondary connection point and the breathing device when a primary pressure in the primary side decreases below a second pressure threshold.

The arrangement provides full and automatic redundancy all the way from the gas supply to the breathing device. The arrangement can withstand a major damage on either the primary side or the secondary side, such as a hose rupture, and still provide a continuous supply of gas to the user to enable breathing.

For example, in case of a damage on the primary side, the primary pressure may rapidly decrease to an ambient pressure level. This will cause the second valve to automatically open and the gas in a secondary container can be consumed through the secondary side. Conversely, in case of a damage on the secondary side, the secondary pressure may rapidly decrease to an ambient pressure level. This will cause the first valve to automatically close and the gas in the primary container can be consumed through the primary side. In case of a damage on the secondary side, no pressure drop, or substantially no pressure drop, will occur on the primary side. The arrangement can thereby automatically provide a continuous gas supply to the user, and ensure provision of a minimum amount of gas, regardless of where the failure occurs, i.e. upon a major failure on either the primary side or the secondary side. The user is thereby allowed to focus on a safe return or "bail out".

During normal use of the arrangement, gas is initially supplied from both the primary container and the secondary container through the primary side. When the pressure in the secondary side, i.e. the pressure supplied by the secondary container, decreases below the first pressure threshold level, the first valve will automatically close the first fluid connection. Gas may then be consumed from only the primary container while a certain minimum amount of gas is saved in the secondary container. When the first fluid connection is closed, gas in the primary container can only be supplied to the breathing device via the primary side and gas in the secondary container can only be supplied to the breathing device via the secondary side. Thus, when the first fluid connection is closed, the gas supplies from the primary container and the secondary container are separated. The minimum amount of gas saved in the secondary container may be set in dependence of regulations and/or intended use of the arrangement, i.e. by setting the first pressure threshold to a certain level.

When the primary pressure eventually decreases below the second pressure threshold, the second valve establishes the second fluid connection between the secondary connection point and the breathing device. The second valve may for example open to establish the second fluid connection.

The primary pressure may be a pressure in the primary side upstream of a primary one-way valve. Alternatively, or in addition, the primary pressure may be a pressure in the primary side between downstream of a primary pressure-reducing valve, e.g. between the primary pressure-reducing valve and the primary one-way valve.

The primary side may alternatively be referred to as a primary system or first system, and the secondary side may be referred to as a secondary system or second system. The first valve and/or the second valve may be a gate valve. The breathing device may be a breathing mask, such as a full face mask (FFM).

The first valve may be arranged to automatically establish the first fluid connection when the secondary pressure increases above the first pressure threshold. The first valve may for example be arranged to open to establish the first fluid connection (and close to close the first fluid connection). Both the primary container and the secondary container can be filled by providing a gas supply to the secondary connection point. For example, a secondary pressure-reducing valve may be detached and replaced with a gas supply connection during filling of the primary container and secondary container.

During initial filling, the secondary pressure may be below the first pressure threshold and the first valve will be closed. Gas is thereby only supplied into the secondary container. Eventually, the secondary pressure will increase above the first pressure threshold and the first valve will open. Gas is then supplied into both the primary container and the secondary container.

The second valve may be arranged to automatically close the second fluid connection when the primary pressure increases above the second pressure threshold. Throughout the present disclosure, the first valve may be referred to as a separation valve and/or the second valve may be referred to as a switching valve.

The arrangement may further comprise a primary container for containing pressurized gas connected to the primary connection point, and a secondary container for containing pressurized gas connected to the secondary connection point. Each of the primary container and the secondary container may be configured to deliver breathing gas under a high pressure. The primary container and the secondary container may be separate. Although being separate, the primary container and the secondary container may be fixed with respect to each other, e.g. in a common container package. Throughout the present disclosure, the primary container may be a primary cylinder and the secondary container may be a secondary cylinder.

The arrangement may further comprise a primary valve between the primary connection point and the primary container. The primary valve may be used to regulate a gas flow from the primary container. The arrangement may further comprise a secondary valve between the secondary connection point and the secondary container. The secondary valve may be used to regulate a gas flow from the secondary container.

A maximum volume of the primary container may differ less than 10%, such as less than 5%, such as less than 2%, from a maximum volume of the secondary container. If the arrangement is used under water, e.g. if the arrangement is used in a self-contained underwater breathing apparatus (SCUBA), the arrangement is very well balanced, at least until the first valve closes the first fluid connection. This is because the amount of gas in the primary container and the secondary container will be equal, or substantially equal, generating equal, or substantially equal buoyancy forces.

The arrangement may thus comprise a container package comprising the primary container and the secondary container. The container package can thereby by symmetric, have a low profile (which reduces the drag coefficient in water) for diving in narrow spaces (e.g. in caves) and improve the balance (pitch and roll) for the diver in the water space. This further increases safety of the arrangement.

The primary side may provide a primary path between the primary container and the breathing device, the secondary side may provide a secondary path between the secondary container and the breathing device, and the primary path and the secondary path may be independent. In this way, an automatic and full redundancy is provided all the way from the gas supply to the breathing device. As long as the breathing device works, the arrangement can withstand a major damage on either the primary side or the secondary side, such as a hose rupture, and still enable the user to breathe. Alternatively, the primary side and the secondary side may be joined upstream of the breathing device in some implementations, e.g. downstream of the second valve and downstream of a second pilot connection point.

The first pressure threshold may be higher than the second pressure threshold. The first pressure threshold may for example be set to provide a sufficient gas supply from the secondary container for a safe return, e.g. for a firefighter to return out from a building or for a diver to return to the surface. The first pressure threshold may be between 50 bar overpressure and 150 bar overpressure, such as between 70 bar overpressure and 130 bar overpressure, such as between 80 bar overpressure and 100 bar overpressure, such as 90 bar overpressure. As used herein, an overpressure refers to a pressure above the ambient pressure of the arrangement. For example, in case the ambient pressure is 1 bar, the absolute value of the first pressure threshold may be 91 bar, and in case the ambient pressure is 6 bar, the absolute value of the first pressure threshold may be 96 bar.

The first pressure threshold may thus be a first threshold value. Alternatively, the first pressure threshold may be a first threshold band. That is, the first valve may open when the secondary pressure increases over an opening pressure within the first threshold band and the first valve may close when the secondary pressure decreases below a closing pressure within the first threshold band, where the opening pressure is higher than the closing pressure. Thus, the first valve may be provided with hysteresis.

Alternatively, or in addition, the second pressure threshold may be between 1.2 bar overpressure and 3 bar overpressure, such as between 1.5 bar overpressure and 2.5 bar overpressure, such as 2 bar overpressure. The second pressure threshold may thus be a second threshold value. Alternatively, the second pressure threshold may be a second threshold band. That is, the second valve may open when the primary pressure increases over an opening pressure within the second threshold band and the second valve may close when the primary pressure decreases below a closing pressure within the second threshold band, where the opening pressure is higher than the closing pressure. Thus, the second valve may be provided with hysteresis.

The arrangement may further comprise a primary one-way valve arranged on the primary side and a secondary one-way valve arranged on the secondary side. For example, the primary one-way valve and the secondary one-way valve may be arranged in the breathing device. The primary one-way valve may allow a flow to a primary breathing outlet of the breathing device, and block a flow in the opposite direction. The secondary one-way valve may allow a flow to a secondary breathing outlet of the breathing device, and block a flow in the opposite direction. Each of the primary one-way valve and the secondary one-way valve may for example be a check valve.

The arrangement may further comprise an automatic pressure warning device that automatically issues a warning to the user when the pressure in the primary container and/or the pressure in the secondary container decreases below a third pressure threshold. The warning may for example be issued as a blinking light in the breathing device. The third pressure threshold may be lower than the first pressure threshold and/or higher than the second pressure threshold. The third pressure threshold may for example be between 40 bar overpressure and 90 bar overpressure, such as between 50 bar overpressure and 60 bar overpressure, such as 55 bar overpressure.

Alternatively, or in addition, the arrangement may further comprise a pressure gauge, such as a manometer, associated with each or one of the primary container and the secondary container. For example, in case a diver forgets to read the manometer, is unable to read the manometer due to poor visibility, or upon an error in the manometer, the pressure warning device automatically and independently provides a warning to the user when the pressure decreases below the third pressure threshold. Upon receiving the warning from the pressure warning device, the user should initiate return, e.g. ascend to the surface.

The arrangement may further comprise a primary pressure-reducing valve arranged on the primary side between the primary connection point and the breathing device. In this case, the primary pressure may be a pressure in the primary side downstream of the primary pressure-reducing valve, e.g. between the primary pressure-reducing valve and the breathing device. The primary pressure-reducing valve may be configured to reduce the pressure upstream of the primary pressure-reducing valve to a medium pressure, e.g. between 7 bar overpressure and 10 bar overpressure.

The arrangement may further comprise a secondary pressure-reducing valve arranged on the secondary side between the secondary connection point and the second valve. In this case, the secondary pressure may be a pressure in the secondary side upstream of the secondary pressure-reducing valve, e.g. between the first valve and the secondary pressure-reducing valve. The secondary pressure-reducing valve may be configured to reduce the secondary pressure to a medium pressure, e.g. between 7 bar overpressure and 10 bar overpressure.

The arrangement may further comprise a primary high pressure line between the primary connection point and the primary pressure-reducing valve and a secondary high pressure line between the secondary connection point and the secondary pressure-reducing valve. Alternatively, or in addition, the arrangement may further comprise a primary medium pressure line downstream of the primary pressure-reducing valve and a secondary medium pressure line downstream of the secondary pressure-reducing valve.

The second valve may be provided on the secondary medium pressure line. A second pilot connection point, where the primary pressure for the second valve is taken, may be provided on the primary medium pressure line.

The primary side may comprise a primary outlet line, the secondary side may comprise a secondary outlet line, the breathing device may comprise a primary breathing outlet for fluid communication with the primary outlet line; and the breathing device may comprise a secondary breathing outlet for fluid communication with the secondary outlet line.

The primary medium pressure line may transition into the primary outlet line downstream of the second pilot connection point. Alternatively, or in addition, the secondary medium pressure line may transition into the secondary outlet line downstream of the second valve.

According to a further aspect, there is provided a breathing apparatus comprising an arrangement according to the present disclosure. The breathing apparatus may be configured to supply breathing gas to a diver, e.g. for deep diving, or to a firefighter. According to one example, the breathing apparatus is a SCUBA apparatus.

According to a further aspect, there is provided a breathing device for a breathing apparatus, the breathing device comprising a primary connection point, a secondary connection point, a primary breathing outlet for connection to a primary outlet line outside the breathing device via the primary connection point, and a secondary breathing outlet for connection to a secondary outlet line outside the breathing apparatus via the secondary connection point.

The breathing device may further comprise a primary one-way valve arranged between the primary connection point and the primary breathing outlet, and a secondary one-way valve arranged between the secondary connection point and the secondary breathing outlet. Alternatively, or in addition, the breathing device may be a full face breathing mask. The breathing device according to this aspect may be of any type according to the present disclosure.

BRIEF DESCRIPTION OF THE DRAWINGS

Further details, advantages and aspects of the present disclosure will become apparent from the following embodiments taken in conjunction with the drawings, wherein:

FIG. 1: schematically represents a breathing apparatus comprising an arrangement.

DETAILED DESCRIPTION

In the following, an arrangement for a breathing apparatus, and a breathing apparatus comprising such arrangement, will be described. The same or similar reference numerals will be used to denote the same or similar structural features.

FIG. 1 schematically represents a breathing apparatus 10 comprising an arrangement 12. The arrangement 12 comprises a primary side 14 and a secondary side 16. The arrangement 12 further comprises a breathing device 18, here exemplified as a full face breathing mask, a primary connection point 20 and a secondary connection point 22. The breathing device 18 can be worn by the user (not shown), such that the user breathes through the breathing device 18.

The primary side 14 is arranged between the primary connection point 20 and the breathing device 18. The secondary side 16 is arranged between the secondary connection point 22 and the breathing device 18.

The arrangement 12 of this example further comprises a primary container 24 and a secondary container 26. Each of the primary container 24 and the secondary container 26 contains pressurized breathing gas, for example air or nitrox.

The pressures in the primary container 24 and the secondary container 26 may be at least 200 bar, such as at least 300 bar, when filled. The primary container 24 and the secondary container 26 are rigid and have identic volumes.

The arrangement 12 further comprises a primary valve 28, here exemplified as a shut-off valve. The primary container 24 is connected to the primary connection point 20 via the primary valve 28. The primary valve 28 is used to open a gas flow from the primary container 24, such that the primary container 24 is in fluid communication with the primary connection point 20.

The arrangement 12 further comprises a secondary valve 30, here exemplified as a shut-off valve. The secondary container 26 is connected to the secondary connection point 22 via the secondary valve 30. The secondary valve 30 is used to open a gas flow from the secondary container 26, such that the secondary container 26 is in fluid communication with the secondary connection point 22.

The arrangement 12 further comprises a first valve 32. The first valve 32 is arranged between the primary connection point 20 and the secondary connection point 22. The first valve 32 is arranged to automatically close to close a first fluid connection between the primary connection point 20 and the secondary connection point 22 when a secondary pressure in the secondary side 16 decreases below a first pressure threshold. The first valve 32 of this example is also arranged to automatically open to establish the first fluid connection when the secondary pressure increases above the first pressure threshold. In this example, the first pressure threshold is 90 bar overpressure.

The arrangement 12 of the example in FIG. 1 comprises an intermediate line 34 between the primary connection point 20 and the secondary connection point 22, and the first valve 32 is a gate valve arranged on the intermediate line 34. The first valve 32 comprises a first pilot line 36. The first pilot line 36 is connected to a first pilot connection point 38 on the secondary side 16, between the secondary connection point 22 and the first valve 32.

The primary side 14 of this example comprises a primary high pressure line 40, a primary medium pressure line 42 and a primary outlet line 44. Each of the primary high pressure line 40, the primary medium pressure line 42 and the primary outlet line 44 may be implemented as a flexible hose. Also the intermediate line 34 may be implemented as a flexible hose.

The secondary side 16 of this example comprises a secondary high pressure line 46, a secondary medium pressure line 48 and a secondary outlet line 50. Each of the secondary high pressure line 46, the secondary medium pressure line 48 and the secondary outlet line 50 may be implemented as a flexible hose.

The arrangement 12 further comprises a primary regulator or primary pressure-reducing valve 52 and a secondary regulator or secondary pressure-reducing valve 54. The primary pressure-reducing valve 52 is provided on the primary side 14, between the primary high pressure line 40 and the primary medium pressure line 42. The secondary pressure-reducing valve 54 is provided on the secondary side 16, between the secondary high pressure line 46 and the secondary medium pressure line 48. Thus, the primary pressure-reducing valve 52 is provided downstream of the primary high pressure line 40 and the secondary pressure-reducing valve 54 is provided downstream of the secondary high pressure line 46.

The primary pressure-reducing valve 52 is configured to reduce the pressure in the primary high pressure line 40 to a medium pressure, e.g. of 7 bar overpressure to 10 bar overpressure, in the primary medium pressure line 42. The secondary pressure-reducing valve 54 is configured to reduce the pressure in the secondary high pressure line 46 to a medium pressure, e.g. of 7 bar overpressure to 10 bar overpressure, in the secondary medium pressure line 48.

One or more buoyancy control devices (not shown) may be connected to the primary pressure-reducing valve 52 and the secondary pressure-reducing valve 54. One example of such buoyancy control device is an inflatable dry suit.

The arrangement 12 further comprises a second valve 56. The second valve 56 is arranged on the secondary side 16. The second valve 56 is arranged to automatically open to establish a second fluid connection between the secondary connection point 22 and the breathing device 18 when a primary pressure in the primary side 14 decreases below a second pressure threshold. The second valve 56 of this example is also arranged to automatically close to close the second fluid connection when the primary pressure increases above the second pressure threshold. In this example, the second pressure threshold is 2 bar overpressure.

The second valve 56 is here exemplified as a gate valve arranged on the secondary medium pressure line 48. The second valve 56 comprises a second pilot line 58. The second pilot line 58 is connected to a second pilot connection point 60 on the primary side 14. In this example, the second pilot connection point 60 is provided on the primary medium pressure line 42.

Downstream of the second pilot connection point 60, the primary medium pressure line 42 transitions into, or is integrally formed with, the primary outlet line 44. Thus, the primary medium pressure line 42 and the primary outlet line 44 may be formed by one single hose, or by two connected hoses. The arrangement 12 comprises a primary one-way valve 62, here exemplified as a check valve, on the primary outlet line 44. In this example, the primary one-way valve 62 is arranged on the primary outlet line 44 inside the breathing device 18.

Downstream of the second valve 56, the secondary medium pressure line 48 transitions into, or is integrally formed with, the secondary outlet line 50. Thus, the secondary medium pressure line 48 and the secondary outlet line 50 may be formed by one single hose, or by two connected hoses. The arrangement 12 comprises a secondary one-way valve 64, here exemplified as a check valve, on the secondary outlet line 50. In this example, the secondary one-way valve 64 is arranged on the secondary outlet line 50 inside the breathing device 18.

The breathing device 18 of this example comprises a primary breathing outlet 66 and a secondary breathing outlet 68. The primary breathing outlet 66 comprises a primary breathing valve 70 and the secondary breathing outlet 68 comprises a secondary breathing valve 72. The primary breathing valve 70 is connected to the primary outlet line 44 and the secondary breathing valve 72 is connected to the secondary outlet line 50.

The primary one-way valve 62 allows gas flow in a direction towards the primary breathing outlet 66, and prevents gas flow in an opposite direction. The secondary one-way valve 64 allows gas flow in a direction towards the secondary breathing outlet 68, and prevents gas flow in an opposite direction.

As illustrated in FIG. 1, the primary outlet line 44 and the secondary outlet line 50 are connected to separate attachment points (not denoted) on the breathing device 18. Thereby, a primary fluid path is provided from the primary container 24, through the primary side 14 and to the primary breathing outlet 66 of the breathing device 18, and a secondary fluid path, independent from the primary fluid path, is provided from the secondary container 26, through the secondary side 16 and to the secondary breathing outlet 68 of the breathing device 18.

In order to fill the primary container 24 and the secondary container 26 with pressurized gas, the secondary pressure-reducing valve 54 may be temporarily disconnected and a source of pressurized gas may be connected to the secondary side 16, i.e. at the position of the secondary pressure-reducing valve 54. During filling, the secondary pressure may initially be lower than the first pressure threshold controlling the operation of the first valve 32. The first valve 32 is then consequently closed and the gas is only supplied to the secondary side 16 and the secondary container 26 to increase the secondary pressure. When the secondary pressure increases above the first pressure threshold, the first valve 32 opens. During further filling, pressurized gas is supplied to the primary side 14 and the primary container 24 until the pressure in the primary container 24 reaches the first pressure threshold. During further filling, pressurized gas is supplied to both the primary side 14 and the secondary side 16 such that the pressure in the primary container 24 and the pressure in the secondary container 26 each reaches a desired level, e.g. 300 bar.

The primary valve 28 and the secondary valve 30 may be used to perform a precheck, e.g. to check the functionality of the breathing apparatus 10 before diving. By means of the primary valve 28 and the secondary valve 30, various failure modes can be simulated without consuming much gas. The primary valve 28 and the secondary valve 30 may then be fully open during use.

When the primary container 24 and the secondary container 26 have been filled and the user has started to breathe pressurized gas from the breathing device 18, the secondary pressure is initially above 90 bar overpressure and the secondary pressure is initially above 2 bar overpressure. Thus, the first valve 32 is open and the second valve 56 is closed. Thereby, pressurized gas is initially supplied to the breathing device 18 from both the primary container 24 and the secondary container 26 via the primary side 14. During normal use of the breathing apparatus 10, each of the primary valve 28 and the secondary valve 30 is open so that the pressure prevailing in the primary container 24 prevails at the primary connection point 20 and the pressure prevailing in the secondary container 26 prevails at the secondary connection point 22. Eventually, when secondary pressure (e.g. at the secondary connection point 22) decreases below the first pressure threshold, the first valve 32 closes.

After closing of the first valve 32, the user only consumes pressurized gas from the primary container 24 through the primary side 14. By closing the first valve 32, a certain amount of gas is reserved in the secondary container 26. After further consumption of pressurized gas from the primary container 24, the pressure in the primary container 24 will eventually decrease below a third pressure threshold, such as 55 bar overpressure. A pressure warning device (not shown) may thereby issue a signal to the user for safe return.

After further consumption of pressurized gas from the primary container 24, the primary pressure (e.g. at the second pilot connection point 60) will eventually decrease below the second pressure threshold. The second valve 56 will thereby automatically open to initiate a supply from the secondary container 26 to the breathing device 18 via the secondary side 16 during return by the user.

In case of damage on the primary side 14, e.g. due to a rupture of any of the primary high pressure line 40, the primary medium pressure line 42 or the primary outlet line 44, the primary pressure will rapidly decrease to an ambient pressure level. This will cause the pressure warning device to issue a warning signal to the user and the second valve 56 to open. Pressurized gas can now be consumed from secondary container 26 through the intact secondary side 16.

In case of a damage on the secondary side 16, e.g. due to a rupture of any of the secondary high pressure line 46, the secondary medium pressure line 48 or the secondary outlet line 50, the secondary pressure will rapidly decrease to an ambient pressure level. This will cause the first valve 32 to automatically close. The pressure in the primary container 24 will in this case remain substantially unchanged and gas in the primary container 24 can still be consumed through the primary side 14. Eventually, the pressure in the primary container 24 will decrease below the third pressure threshold and the automatic warning by the pressure warning device will be issued, so that the user knows he/she has to initiate safe return, if not already initiated upon the damage on the secondary side 16.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. An arrangement for a breathing apparatus, the arrangement comprising:
- a breathing device;
- a primary connection point for fluid communication with a primary container;
- a secondary connection point for fluid communication with a secondary container;
- a primary side arranged between the primary connection point and the breathing device;
- a secondary side arranged between the secondary connection point and the breathing device;
- a first valve arranged between the primary connection point and the secondary connection point, the first valve being arranged to automatically close a first fluid connection between the primary connection point and the secondary connection point when a secondary pressure in the secondary side decreases below a first pressure threshold such that the first valve operates as a one-way valve by (i) when in an open configuration, providing pressurized gas from the secondary connection point to the primary connection point, and (ii) when in a closed configuration, inhibiting pressurized gas from flowing through the first valve;
- a second valve arranged on the secondary side, the second valve being arranged to automatically establish a second fluid connection between the secondary connection point and the breathing device when a primary pressure in the primary side decreases below a second pressure threshold;
- a primary shut-off valve arranged between the primary container and the primary connection point; and
- a secondary shut-off valve arranged between the secondary container and the secondary connection point.

2. The arrangement according to claim 1, wherein the first valve is arranged to automatically establish the first fluid connection when the secondary pressure increases above the first pressure threshold.

3. The arrangement according to claim 1, wherein the second valve is arranged to automatically close the second fluid connection when the primary pressure increases above the second pressure threshold.

4. The arrangement according to claim 1, further comprising a primary container for containing pressurized gas connected to the primary connection point, and a secondary container for containing pressurized gas connected to the secondary connection point.

5. The arrangement according to claim 4, wherein a maximum volume of the primary container differs less than 10% from a maximum volume of the secondary container.

6. The arrangement according to claim 4, wherein the primary side provides a primary path between the primary container and the breathing device, wherein the secondary side provides a secondary path between the secondary container and the breathing device, and wherein the primary path and the secondary path are independent.

7. The arrangement according to claim 1, wherein the first pressure threshold is higher than the second pressure threshold.

8. The arrangement according to claim 1, wherein the first pressure threshold is between 50 bar overpressure and 150 bar overpressure.

9. The arrangement according to claim 1, wherein the second pressure threshold is between 1.2 bar overpressure and 3 bar overpressure.

10. The arrangement according to claim 1, further comprising a primary one-way valve arranged on the primary side and a secondary one-way valve arranged on the secondary side.

11. The arrangement according to claim 1, further comprising a primary pressure-reducing valve arranged on the primary side between the primary connection point and the breathing device.

12. The arrangement according to claim 11, wherein the primary pressure is a pressure in the primary side downstream of the primary pressure-reducing valve.

13. The arrangement according to claim 1, further comprising a secondary pressure-reducing valve arranged on the secondary side between the secondary connection point and the second valve.

14. The arrangement according to claim 13, wherein the secondary pressure is a pressure in the secondary side upstream of the secondary pressure-reducing valve.

15. The arrangement according to claim 1, wherein the primary side comprises a primary outlet line, wherein the secondary side comprises a secondary outlet line, wherein the breathing device comprises a primary breathing outlet for fluid communication with the primary outlet line; and wherein the breathing device comprises a secondary breathing outlet for fluid communication with the secondary outlet line.

16. A breathing apparatus comprising an arrangement according to claim 1.

17. The arrangement according to claim 4, wherein a maximum volume of the primary container differs less than 5% from a maximum volume of the secondary container.

18. The arrangement of claim 4, wherein a maximum volume of the primary container differs less than 2% from a maximum volume of the secondary container.

19. The arrangement according to claim 1, wherein the second pressure threshold is between 1.5 bar overpressure and 2.5 bar overpressure.

20. The arrangement according to claim 1, wherein the second pressure threshold is 2 bar overpressure.

* * * * *